United States Patent [19]

Kuhn

[11] Patent Number: 4,531,070
[45] Date of Patent: Jul. 23, 1985

[54] TURBINE GENERATOR HYDROGEN FILTRATION SYSTEM

[75] Inventor: Earl C. Kuhn, Penn Hills Twp., Pa.

[73] Assignee: Westinghouse Electric Corp., Pittsburgh, Pa.

[21] Appl. No.: 442,071

[22] Filed: Nov. 16, 1982

[51] Int. Cl.³ .............................................. H02K 9/26
[52] U.S. Cl. ....................................... 310/56; 55/316; 55/350; 55/385 R
[58] Field of Search ....................... 310/53, 54, 55, 56, 310/58, 64; 55/218, 219, 274, 316, 275, 385 R, 387, 350, 269; 184/6, 6.26, 6.16, 6.24; 60/39.08; 417/407–409, 902

[56] References Cited

U.S. PATENT DOCUMENTS

| | | | |
|---|---|---|---|
| 3,122,668 | 2/1964 | Cuny | 310/53 |
| 3,347,026 | 10/1967 | Zankey | 55/316 |
| 3,891,417 | 6/1975 | Wade | 55/274 |
| 3,901,670 | 8/1975 | Minami | 55/219 |
| 4,050,237 | 9/1977 | Pall et al. | 60/39.08 |
| 4,231,768 | 11/1980 | Siebert et al. | 55/275 |
| 4,300,066 | 11/1981 | Butler | 55/274 |

FOREIGN PATENT DOCUMENTS 942685 2/1974 Canada .............................. 184/6.24
91649 7/1981 Japan ..................................... 310/56

OTHER PUBLICATIONS

Liquid Film Seal for Hydrogen Cooled Machines–Rice General Electric Review, 11/27, pp. 516–530.
Gland Seal Systems for Modern Hydrogen Cooled Turbine Generators–Baudry et al.–Power App. & Systems, 6/51, pp. 1–10.

Primary Examiner—Bernard Nozick
Attorney, Agent, or Firm—G. H. Telfer

[57] ABSTRACT

A gas filtration system is provided for coolant systems for dynamoelectric machines which utilizes differential pressures within the machine to induce a gas flow through the system. Valves are provided to balance dual inlet flows and the filtration system utilizes an air filter, coalescing filters and gaseous containment filter in its preferred embodiment. The filtration avoids the need for additional pumping by disposing its filtering means between and in fluid communication with two or more zones having different gas pressures.

7 Claims, 2 Drawing Figures

TURBINE GENERATOR HYDROGEN FILTRATION SYSTEM

BACKGROUND AND SUMMARY OF THE INVENTION

The present invention relates generally to filtration systems and, more particularly, to the removal of oil mist from the hydrogen cooling systems of turbine generators.

The proper performance of a hydrogen-cooled generator depends, inter alia, on the purity of the hydrogen which is circulated throughout its frame and in contact with its conductive components. Typically, hydrogen-cooled generators operate with hydrogen purities well in excess of 95 percent. When hydrogen purity falls below a preselected minimum acceptable value, this condition is typically corrected by purging a portion of the contaminated hydrogen and then refilling the system with pure hydrogen in order to raise the overall purity level of the generator's hydrogen cooling system.

Gas-borne impurities within the hydrogen stream typically consist of styrene, anomine, various other gases which emanate from the epoxies which are used throughout the generator, particulates which are caused by the heating of non-metallic components and oil which exists both in the form of small droplets and gaseous molecules.

The oil, which generally exists as both a mist and a gas within the hydrogen stream, can adversely affect the electrical quality of the generators insulative components and degrade the overall purity of the hydrogen within the generator's cooling system. A reduction in the purity of the hydrogen gas within an electrical generator can have significant deleterious effects on the generator's windage losses and overall efficiency.

A significant and sometimes primary cause for the existance of oil mist within the cooling hydrogen of a turbine generator is the leakage of oil-laden gas from the generator's defoaming tanks into the generator's stator housing through the generator rotor's labyrinth seals. Many types of electrical generators utilize gland seals to contain hydrogen within the generator's frame. These gland seals operate by surrounding a portion of the generator rotor, with a very small gap between the stationary gland seal and the rotating rotor, and injecting a stream of oil into the interface therebetween. The passage of oil in an inboard axial direction prevents hydrogen gas from escaping from within the generator frame through this interface. Upon leaving this interface region of the gland seal, the oil is collected in a defoaming tank and recirculated within the oil system of the generator. These gland seals are located at both the turbine and exciter end of the rotor shaft and are provided with a deflector which prevents the oil from splashing directly against the labyrinth seals as it is ejected from the gland seals. Although the deflectors are generally successful in this function, it is possible that a quantity of oil can be ejected from the gland seals with sufficient velocity to enter the labyrinth seals.

A more severe cause of oil contamination of the hydrogen coolant is the defoaming tank itself. The defoaming tank contains oil in both liquid and vapor form. The defoaming tank contains a quantity of liquid oil at its bottom portion which will eventually be recirculated through the generator's oil system. Above this liquid oil is a mixture of hydrogen gas with oil mist dispersed throughout it and with gaseous oil molecules mixed therethrough. This contaminated gas within the defoaming tank is separated from the cooling hydrogen which exists within the generator's frame by the above-mentioned labyrinth seals. However, if the pressure within the defoaming tank exceeds that of the hydrogen gas on the opposite side of the labyrinth seal, the contaminated gas from above the oil in the defoaming tank can flow through the labyrinth seal into the cooling region of the generator frame and contaminate the much purer quantity of hydrogen used to cool the generator.

Although the pressure of the defoaming tank is intended to be kept at a value less than that of the hydrogen within the generator frame, various causes, including a rise of the oil temperature within the defoaming tank, can cause the pressure within the defoaming tank to exceed that of the hydrogen gas located within the generator. As described above, this increase in gas pressure within the defoaming tank can cause the harmful flow of contaminated gas through the labyrinth seal and into the generator frame causing contamination of the generator's hydrogen cooling system.

The present invention takes advantage of the differential pressures which normally exist within the generator frame in order to direct a portion of the oil-laden mist from within the defoaming tanks through a filtration system which removes a significant percentage of the contaminants from the hydrogen stream and returns the purified hydrogen into the generator's hydrogen circulation system. A pipe is connected in fluid communication with the contaminated gas above the liquid oil in the defoaming tank. This pipe is also connected in fluid communication with an inlet portion of a filtration system. An outlet portion of the filtration system is connected, with appropriate piping, in fluid communication with a portion of the hydrogen cooling system which is known to be at a lower pressure than the gas of the defoaming tank. This differential pressure causes a portion of the contaminated gas to flow from the defoaming tank, through the filtration system and back into the hydrogen cooling system of the turbine generator. Due to this natural flow which is caused by the differential pressures, no additional power is needed to pump the gas through the present invention. The filtration system of the present invention can comprise an air filter, means for coalescing small droplets of oil into larger droplets which can be removed from the gas stream and means for absorbing molecular contaminants which remain in the gas stream after the filtering and coalescing operations.

Since it is typical for a generator to have a defoaming tank at each end of its stator frame, the present invention anticipates the use of two inlet pipes connected to the inlet of the filtration system. Each inlet pipe would connect one of the defoaming tanks with the filtration system with these two inlet pipes being connected in parallel. In order to assure that each defoaming tank is being equally purged of contaminants, the present invention also can incorporate a means for balancing the flow of the two inlet pipes. This balancing means comprises a flow meter for each inlet pipe along with a valve for each pipe so that the flows through the two inlet pipes can be regulated.

Although not a necessity for the proper functioning of the present invention, a flow meter can be attached to the pipe through which the purified hydrogen returns to the generator's cooling system. This flow meter, in conjunction with an appropriate valve for the return pipe, permits both the monitoring and regulation of the hydrogen flow throughout the present invention. The primary advantage of monitoring the gas flow through the filtration system of the present invention is that, for purposes of maintenance, removable filters can be changed when the flow meter indicates a significant drop in flow from levels experienced with clean and unobstructed filters.

It should be apparent that the present invention provides a means for removing inpurities from the hydrogen cooling system of a turbine generator without requiring additional power to be consumed in order to pump the hydrogen gas through its purifying components. It should be further apparent that the present invention does not diminish the quantity of hydrogen of the generator's cooling system but, instead, passes the purified hydrogen back into a low pressure region of the generator frame.

BRIEF DESCRIPTION OF THE DRAWINGS

The present invention may be best understood by reference to the following description of the preferred embodiment read in connection with the accompanying drawing in which.

DESCRIPTION OF THE PREFERRED EMBODIMENT

The present invention relates generally to filtration systems for turbine generators and, more particularly, to a filtration system which removes gas-borne contaminants, such as oil mist, from the hydrogen stream of the coolant system of a hydrogen cooled turbine generator.

Figure 1:
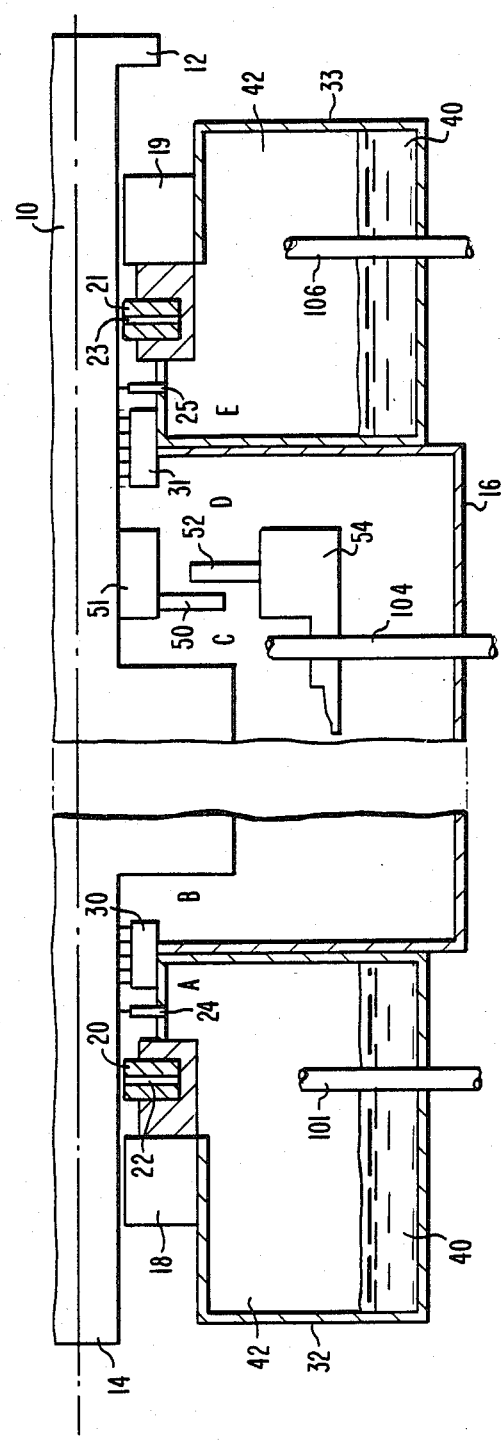
FIG. 1 illustrates the pertinent portions of an exemplary generator shown in conjunction with the inlet and outlet piping connecting the generator frame with the present invention.

FIG. 1 schematically illustrates a typical turbine generator for which the present invention is applicable. The exemplary generator shown in FIG. 1 is illustrated schematically in order to describe the functions and relative physical positions of its internal components. However, it should be understood that dynamoelectric machines with alternative configurations are equally adaptable for use in association with the present invention.

The dynamoelectric machine illustrated in FIG. 1 comprises a rotor member 10 which has both a turbine end 12 and an exciter end 14. The rotor 10 is symmetrical about a center line, as shown, and extends axially outward from the generator frame 16 in two opposite directions along the center line. The rotor 10 is supported by two bearings, 18 and 19, and disposed axially inboard from each bearing are gland seals, 20 and 21, which are each provided with a conduit means, 22 and 23, for injecting oil radially inward toward the interface between the gland seals and the rotor 10. By filling the interface between the gland seals and the shaft with oil, hydrogen is prevented from leaking axially outward through the gland seal region.

As shown in FIG. 1, each gland seal is provided with a deflector, 24 and 25, which substantially prevents the oil from being ejected away from the gland seal interface and into the labyrinth seals, 30 and 31. The purpose of the labyrinth seals, 30 and 31, is to prevent a massive hydrogen leak from the internal portion of the generator frame 16 in an axially outward direction. However, it should be understood that in most generator applications it is preferable to have a slight radially outward hydrogen leak than to have an axially inward of contaminants into the generator frame 16.

The oil which passes through the conduits, 22 and 23, of the gland seals, 20 and 21, respectively, is collected in defoaming tanks, 32 and 33. In each defoaming tank, liquid oil 40 is collected at the bottom portion with a contaminated atmosphere 42 of hydrogen and oil mist located thereabove.

As described above, it is preferable to have the hydrogen pressure within the generator frame 16 slightly higher than the hydrogen pressure on the opposing side of the gland seals, 30 and 31, which, in the illustration of FIG. 1, includes the defoaming tanks 32 and 33. However, in some applications, the pressure of the contaminated gas 42 in the defoaming tanks exceeds that of the more pure hydrogen within the generator frame 16. This differential pressure can have various causes including a rise in the temperature of the oil and vapor within the defoaming tanks, 32 and 33, and has the deleterious affect of increasing its relative pressure and causing a flow of contaminated hydrogen 42 through the labyrinth seals, 30 and 31, into the hydrogen system within the generator frame 16. It should be apparent that the presence of contaminated hydrogen within the generator's cooling system can have severely negative effects on both the purity level of the hydrogen system and the overall performance and efficiency of the generator.

The present invention operates by withdrawing contaminated hydrogen 42 from above the liquid oil 40 in th defoaming tanks 32 and 33 and, by utilizing the naturally occurring differential pressures within the generator, purifies the contaminated hydrogen 42 and transmits it back into the hydrogen system within the generator frame 16.

In order to more fully describe the beneficial use of the differential pressures within the generator, the exemplary generator illustrated in FIG. 1 has been divided into five exemplary zones, A, B, C, D and E. Although it must be understood that the internal pressures of turbine generators will vary considerably for various designs, the generator of FIG. 1 will be described with reference to specific pressures within these five zones. The contaminated hydrogen gas above the liquid oil 40 in defoaming tank 32, at zone A, is approximately 74.5 psig and the contaminated hydrogen above the liquid oil 40 in defoaming tank 33, at zone E, is approximately 74.75 psig. Zone B, which is located proximate the axially inboard region of the labyrinth seal 30 at the exciter end of the generator is at a pressure of approximately 74.75 psig. Zones C and D, although also within the confines of the generator frame 16, vary from the pressure at zone B. This result is due to the effects of the rotating blower blades 50 which are rigidly attached to a blower hub 51 on the shaft 10 and operate in conjunction with stationary blades 52 which are mounted on a bracket means 54. The rotation of the shaft 10 causes the rotating blower blades 50 to induce a hydrogen flow from zone C to zone D. This effect lowers the pressure at zone C to approximately 72.0 psig while raising the pressure of zone D to approximately 75.0 psig. Although the actual pressures described above are merely exemplary and used to illustrate the differential pressures within the generator shown in FIG. 1, it should be understood that the pressures of the hydrogen gas within a generator vary and exhibit differential pressures which can be used to induce a hydrogen flow as will described below.

From the discussion above, it can be seen that the pressure at zone C, proximate the intake area of the blower system is lower than the pressures above the liquid oil 40 (i.e. zones A and E) in either of the defoaming tanks, 32 or 33. The present invention takes advantage of this differential pressure by installing intake pipes in fluid communication with the contaminated hydrogen 42 above the liquid oil 40. For example, a first pipe 101 passes into the defoaming tank 32 so that it is in fluid communication with the contaminated hydrogen 42 therein. A second pipe 104 is shown passing through the frame 16 and providing fluid communication with the hydrogen gas located at zone C. It should be clear that, since the pressure at zone A is higher than the pressure at zone C, a connection between pipes 101 and 104 would cause a hydrogen gas flow directly from zone A within defoaming tank 32, to zone C which is adjacent the blower blades 50 of the generator. Furthermore, if a filtration system were installed between pipes 101 and 104 and in fluid communication with both of these pipes, the contaminated hydrogen gas from the defoaming tank could be filtered and then reintroduced into the generator at zone C. Since the exemplary generator in FIG. 1 is shown having two defoaming tanks, a third pipe 106 is installed in such a way that it is in fluid communication with the contaminated gas 42 above the liquid oil 40 in defoaming tank 33. Similarly to the case with pipe 101, the pressure of the contaminated gas 42, proximate the intake of pipe 106, is higher than the purer hydrogen located at zone C and an interconnection between pipes 106 and 104 would similarly cause a hydrogen flow from zone E to zone C. Therefore, it should be apparent that, by interconnecting pipes 101 and 106, their combined flow of contaminated hydrogen can be passed through a filtration system, or any alternative means for removing contaminants, and returned to the generator by passing through pipe 104 into zone C. The presence of pipes 101 and 106 within their respective defoaming tanks, 32 and 33, also has the beneficial effect of reducing the pressure of the contaminated hydrogen at zones A and E, respectively, and minimizing the passage of contaminated gas through the respective labyrinth seals, 30 and 31, respectively, in the disadvantageous directions into the generator's frame 16.

Figure 2:
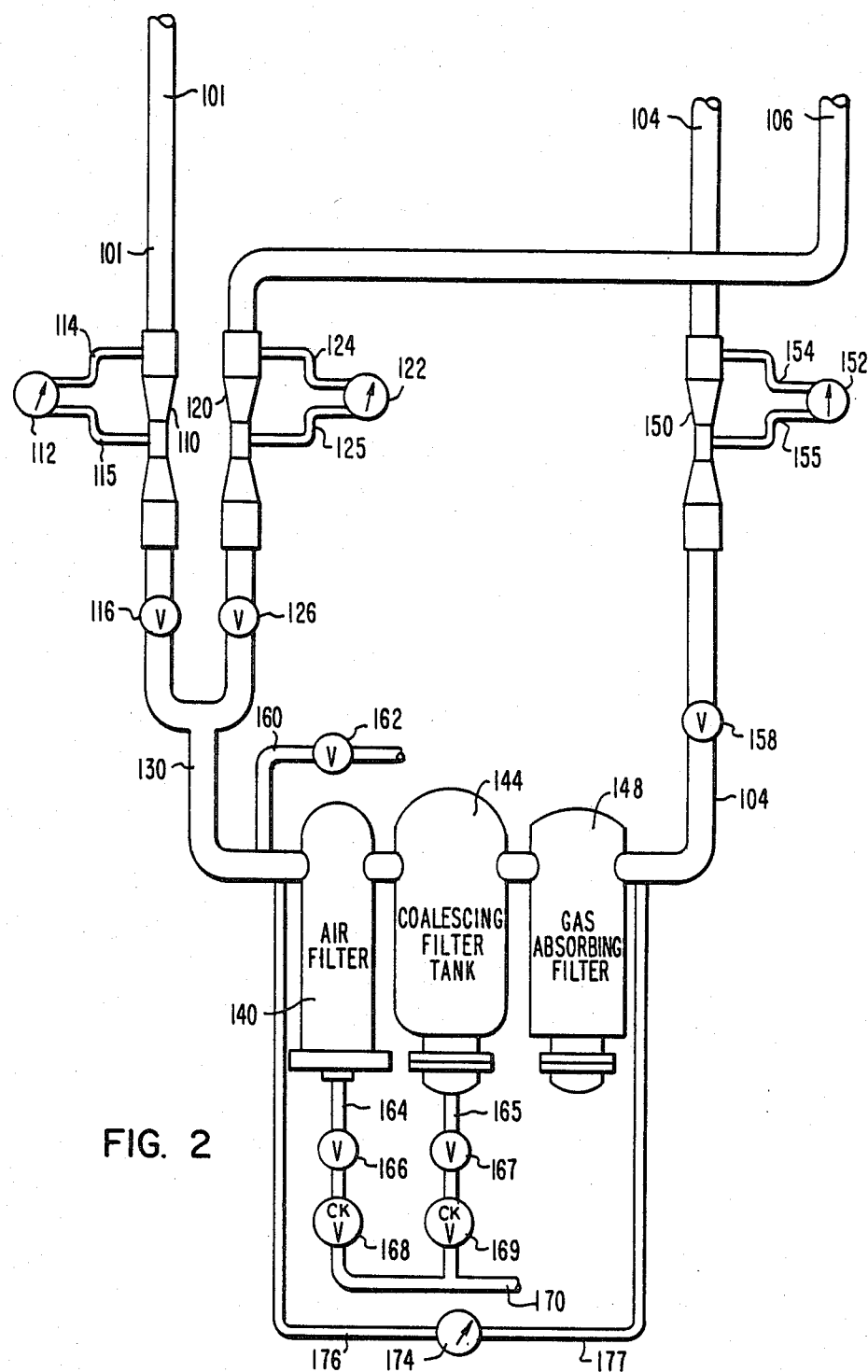
FIG. 2 shows the component parts of the present invention along with its associated piping which would be connected to the generator which is illustrated in FIG. 1.

In FIG. 2, the various components of the present invention are schematically illustrated. The pipes, 101, 104 and 106 should be understood to be continuations of the identically numbered pipes illustrated in FIG. 1. Inlet pipe 101 is provided with a flow meter 110 which is connected to a gauge 112 by appropriate piping 114 and 115. A valve 116 is also provided so that the flow of contaminated gas through inlet 101 can be regulated. Similarly, inlet 106 is provided with a flow meter 120 and a gauge 122 connected to it by appropriate piping 124 and 125 along with a valve 126 which can be used for the purpose of regulating the flow through inlet pipe 106. By the proper use of the valves, 116 and 126, in conjunction with the monitoring of the flows measured on the gauges 112 and 122, the relative flows of contaminated gas through pipes 101 and 106 can be balanced. Although not a requirement for the functioning of the present invention, this ability to balance the flows from the two defoaming tanks illustrated in FIG. 1 has the beneficial effect of providing a generally equal amount of filtration of the contaminated gas located above the liquid oil in each of the two defoaming tanks.

The two inlet pipes, 101 and 106, are joined into a common inlet pipe 130. The present invention comprises a means for removing the contaminants from the contaminated gas flowing through pipe 130. As shown in FIG. 2, this removing means comprises a filter 140, a tank 144 which is a means for coalescing small droplets of oil which are suspended within the stream of hydrogen passing through the present invention and another tank 148 which is a means for absorbing gas-borne contaminants which are in a gaseous state within the hydrogen stream. Although the filter 140 is commonly referred to as an "air filter", it should be understood that it is capable of filtering contaminants from other gases, such as hydrogen. The filter 140 can be any suitable type of filter such as one that is designed to remove liquid aerosols, rust, scale, dirt and other solid particles one micron and larger from a compressed gas stream. These types of air filters typically are constructed of various layers of glass fibers which are very small in diameter and are arranged so that there is a high percentage of void spaces therebetween. Furthermore, they generally comprise a removable cartridge portion which facilitates cleaning and general maintainance procedures. The coalescing type oil filter tank 144 can be any suitable type of coalescing filter such as that described in U.S. Pat. No. 3,802,160 issued to Foltz on Apr. 9, 1974. The primary function of the coalescing filter tank 144 is to cause very small particles of oil to coalesce into larger particles or droplets which can be more easily removed from the hydrogen stream. The gaseous contaminant removing means 148 can be any suitable device which is capable of removing gaseous oil which may remain within the hydrogen stream after it passes through the filter 140 and the coalescing-type filter tank 144. These types of devices generally comprise a bed of finely divided activated carbon particles which absorb a vast majority of remaining gaseous oil from the hydrogen stream. The hydrogen then moves through multiple layers of fibers to which microfine activated carbon particles are bonded and the remaining gaseous oil is absorbed from the hydrogen stream. This device can also have the beneficial affect of removing gaseous contaminates such as styrene, anomine and other deleterious products of combustion which may emanate from the non-metallic components of the generator when subjected to elevated temperatures.

After passing through the filtration means of the present invention, the purified gas is directed through an outlet pipe 104 back into the generator illustrated in FIG. 1. As shown in FIG. 2, the outlet pipe 104 is provided with a flow meter 150 which is associated with a gauge 152 by appropriate piping 154 and 155. Also, the outlet pipe 104 is equipped with a valve 158 so that the overall flow of hydrogen through the filtration system can be regulated.

The present invention can also be equipped with a vent pipe 160 and valve 162. This vent pipe 160, although not a requirement for the proper functioning of the present invention, facilitates the purging of the hydrogen system during maintenance procedures. Also shown in FIG. 2, are pipes 164 and 165 which are connected to the filter 140 and coalescing filter tank 144 in such a way that oil which is trapped in these devices can be removed in order that the life of these devices can be extended. Each of these pipes 164 and 165 is provided with a valve, 166 and 167 respectively, and a check valve, 168 and 169 respectively, to prevent passage of oil in a reverse direction into the filtration system of the present invention. The oil, which is collected from the contaminated hydrogen stream, can be removed from the filtration system of the present invention and returned, through a pipe 170, back into the oil system of the present invention.

Although not a requirement of the present invention, a pressure gauge 174 can be connected, via appropriate piping 176 and 177, to points at opposing sides of the filtration system of the present invention in order to monitor the pressure drop across the air filter 140, the coalescing filter tank 144 and the contaminant absorbing means 148. The advantage of the installation of this pressure gauge 174 is that, by monitoring the pressure drop across these three components, their operating condition can be continually observed in order to determine when maintenance is required. Typically, an increase in the pressure drop across a filter device indicates that the filter has accumulated enough particulates to detrimentally affect the gas flow through it. When this pressure drop increases, the removable filters of the present invention can be removed and replaced.

The present invention, as illustrated in FIGS. 1 and 2, receives a quantity of contaminated hydrogen gas through inlet pipes 101 and 106 and returns a quantity of purified hydrogen gas through outlet pipe 104 into the hydrogen system of the generator. Under normal operation of the present invention, no hydrogen is lost and the oil which is removed from the hydrogen stream is returned, through pipe 170, to the oil system of the generator. Also, no additional power requirements are necessitated for the operation of the present invention. Instead, it utilizes the normally occurring pressure differentials from different zones, or portions, of the turbine generator.

It should be understood that, although FIG. 2 shows a specific preferred embodiment of the present invention, a simplier configuration can be effectively utilized within the scope of the present invention. For example, the flow meters 110 and 120 along with their associated gauges 112 and 122 and valves 116 and 126 are not a requirement of the present invention. These components serve the purpose of improving the balance of flow from each of the two defoaming tanks illustrated in FIG. 1. In generator systems with a single defoaming tank or generator systems in which the pressure within the defoaming tanks are essentially identical, these components are not needed. Furthermore, the flow meter 150 and associated gauge 152 in outlet pipe 104 are not a requirement of the present invention. However, these components, along with the valve 158, serve two important functions. A drop in flow rate through pipe 104, as could be seen on gauge 152, would tend to indicate an accumulation of contaminants within the filter system. Also, valve 158 can serve an important purpose of both controlling the overall volume of hydrogen passing through the filtration system of the present invention and isolating the filtration system from the generator for purposes of maintenance. The pressure gauge 174, although a beneficial component to the system shown in FIG. 2, should be understood to be an optional addition to the present invention and not a requirement.

Although not illustrated in detail in FIG. 2, it should be further understood that the valves 116 and 126 could be automatically controlled through a system which responds to the value of flow rate sensed by the flow meters 110 and 120. With this type of optional system the flows through pipes 101 and 106 could be automatically balanced without the need for manual intervention as would be the case with the system shown in FIG. 2.

It should be apparent to one skilled in the art that a basic system made in accordance with the present invention could comprise a single inlet pipe 101, a single outlet pipe 104 and means for removing gas-borne impurities from the hydrogen gas passing from the generator through inlet pipe 101. This means for removing gas-borne impurities could comprise a single filter or a series of sequential filters as illustrated in FIG. 2. It should be further apparent that many variations, not explicitly described above, could be included in alternative embodiments of the present invention. Among others, a variation of the present invention could include a duplicate and redundant set of filter components connected in parallel so that filter cartridges and other replaceable components could be changed without the need for shutting off the flow of hydrogen through pipes 101, 106 and 104.

It should be apparent that the present invention removes gas-borne impurities, including oil mist, from the hydrogen cooling gas of a turbine generator and helps to prevent the degradation of the hydrogen gas purity due to the presence of oil within it. It should also be apparent that the improvement of hydrogen gas impurity has an economic benefit not only in increased life of components within the generator but also in the decrease of windage losses which are directly caused by decrease in hydrogen purity of turbine generators. Furthermore, it should be noted that the present invention requires no additional power to cause the flow of contaminated hydrogen gas through its filtration system and the return of the hydrogen gas, in a purified state, to the generator. It should further be understood that alternative embodiments of the basic invention described above should be considered within the scope of the present invention.

What I claim is:

1. A gas cooled dynamoelectric machine with gas decontamination comprising:
    a rotor supported for rotation on a pair of axially spaced bearings, said bearings each being supplied with a lubricant;
    a generator frame between said pair of bearings enclosing a volume containing gas cooled parts of the machine with seal means proximate interfaces of said frame and said rotor for limiting escape of gas from said frame;
    said seal means having a gap in relation to said rotor through which said bearing lubricant flows in an axial direction;
    at least one defoaming tank located to receive lubricant and gas from the axial inward side of each of said seal means to form in said at least one defoaming tank a quantity of liquid lubricant above which exists a mist of gas and lubricant vapor;
    said generator frame volume having a normal cooling gas pressure at first regions proximate said seal means greater than the pressure of said mist in said at least one defoaming tank, said generator frame volume also having a second region with a cooling gas pressure less than that at said first regions and also less than that of said mist in said at least one defoaming tank;

means, within said generator frame, for establishing the pressure difference between said generator frame volume first regions and said second region;

first conduit means in fluid communication with said mist in each of said at least one defoaming tank for carrying said mist to a filtration system effective to remove lubricant vapor therefrom; and, second conduit means in fluid communication with said second region of said generator frame volume for carrying clean cooling gas from said filtration system.

2. A gas cooled dynamoelectric machine in accordance with claim 1 wherein:

said means for establishing the pressure difference between said generator frame volume first regions and said second region is a blower rotating with said rotor; and said machine is a turbine generator in which said cooling gas is hydrogen, said lubricant is oil, and circulation of said mist from said defoaming tanks to said filtration system and said clean gas from said filtration system to said frame second region is a result of differential pressures without additional motive power.

3. A gas cooled dynamoelectric machine in accordance with claim 1 further comprising:

a labyrinth seal is located on the axially inward side of each of said seal means at an interface between each of said generator frame volume first portions and said at least one defoaming tank for limiting gas flow from said first volumes into said defoaming tank.

4. A gas cooled dynamoelectric machine in accordance with claim 1 wherein:

said filtration system includes a first chamber for removing particles of one micron and larger from said mist, a second chamber for coalescing small particles into larger particles, and a third chamber for removing such gaseous lubricant as remains after passing through said second chamber.

5. A gas cooled dynamoelectric machine in accordance with claim 1 further comprising means for monitoring gas flow exiting said filtration system.

6. A gas cooled dynamoelectric machine in accordance with claim 1 wherein:

said at least one defoaming tank includes a tank immediately proximate each of said seal means.

7. A gas cooled dynamoelectric machine in accordance with claim 6 further comprising:

means for balancing gas flow from each of said at least one defoaming tank to said filtration system.

* * * * *